April 28, 1942.　　　A. H. HANNON　　　2,281,305
CONVEYER DRIVE FOR PROCESSING MACHINES
Filed Dec. 6, 1940　　　3 Sheets-Sheet 3
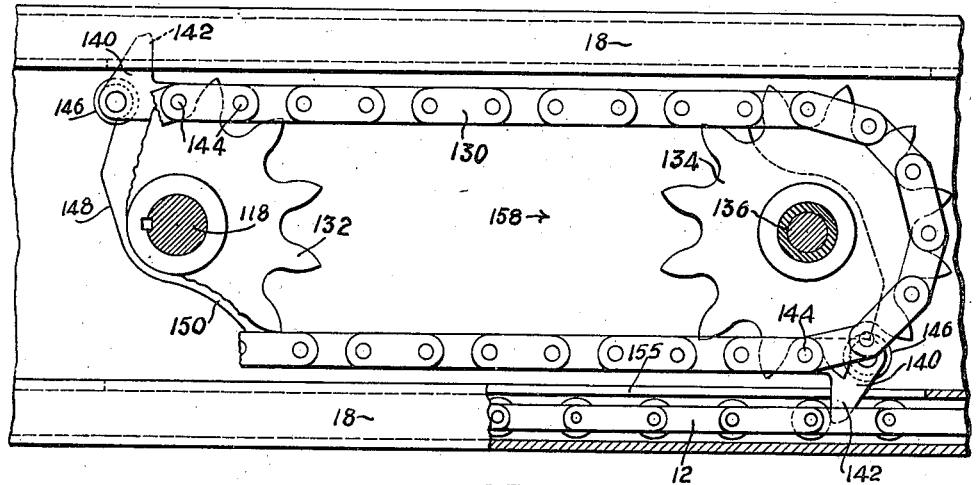
FIG. 3.
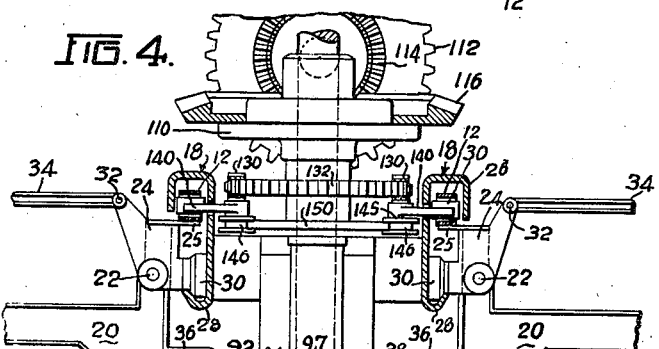
FIG. 4.
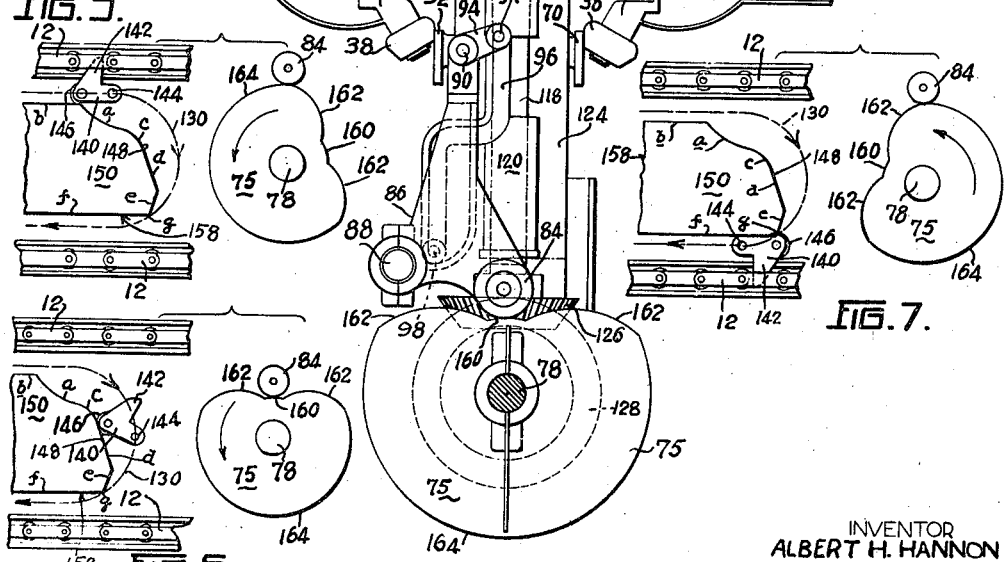
FIG. 5.
FIG. 6.
FIG. 7.
INVENTOR
ALBERT H. HANNON
By
ATTORNEYS Patented Apr. 28, 1942

2,281,305

UNITED STATES PATENT OFFICE 2,281,305

CONVEYER DRIVE FOR PROCESSING MACHINES

Albert H. Hannon, Springfield, Ohio

Application December 6, 1940, Serial No. 368,902

5 Claims. (Cl. 214—17)

This invention relates to an improved driving mechanism, and more particularly to a work piece conveyer drive whereby both horizontal and intermittent vertical movement of the work piece is effected by means of a common prime mover having co-ordinated cam controlled horizontal and vertical moving means.

It is an object of this invention to devise a unitary single drive mechanism for operating work piece processing machines, such as automatic electroplating apparatus, wherein carrier arms are conveyed horizontally over a succession of tanks and are raised and lowered at intervals as required to transfer articles supported on the carrier arms for treatment from one tank to the next.

Another object is to provide an improved mechanism for operating work piece processing machines of the type mentioned wherein the transfer means for lifting the carrier arms over the partitions between the tanks is performed by the prime mover which operates the horizontal conveying mechanism, whereby the use of auxiliary driving and synchronizing means is eliminated.

Another object is to provide an improved driving mechanism for actuating horizontal conveying means which includes coacting cam actuated mechanism for bringing about the elevating and lowering of work carrier arms mounted on the conveying means whereby the horizontal conveying means is stopped at the proper time by the cam mechanism while the work carrier arms are raised and lowered.

Another object is to provide a centralized unitary drive mechanism for machines of the endless conveyer type including supplementary transfer mechanism comprising suitably shaped cam lifter means for effecting the raising and lowering of the carrier arms and wherein a common prime mover means is arranged to operate both the main conveyer and supplementary transfer mechanism.

These and other objects and advantages will be apparent from the detailed description taken in connection with the drawings.

In the drawings:

Figure 3 is an enlarged plan view, partly broken away, showing the main conveyer chain drive mechanism and taken substantially on the line 3—3 of Figure 2 looking in the direction of the arrows;

Figure 4 is an end elevational view, partly in section, of the drive mechanism of this invention taken substantially on the line 4—4 of Figure 2 and looking in the direction of the arrows;

Figures 5, 6 and 7 are fragmentary detail views illustrating the relative position of the carrier arm transfer cam means and the dogs operating the main horizontal conveyer chain.

General construction

In general, the driving mechanism of this invention is designed to provide a centralized driving unit for intermittently moving an endless conveyer chain on a work piece processing machine including a plurality of tanks, and likewise operating the transfer mechanism as required for raising and lowering the work piece carrier arms to lift the work pieces out of one tank and transfer them to the next. Heretofore it has been the practice to use two or more prime movers operated by electrically controlled time switches for bringing about the intermittent synchronized operation of the transfer mechanism and main conveyer. This invention provides an improved driving mechanism wherein the main conveyer chain and transfer mechanism are operated by means of a unitary motor driven unit arranged whereby the proper sequence of operation is effected by suitable cam means without the use of multiple prime movers and electrical time switches, or the like.

Figure 1:
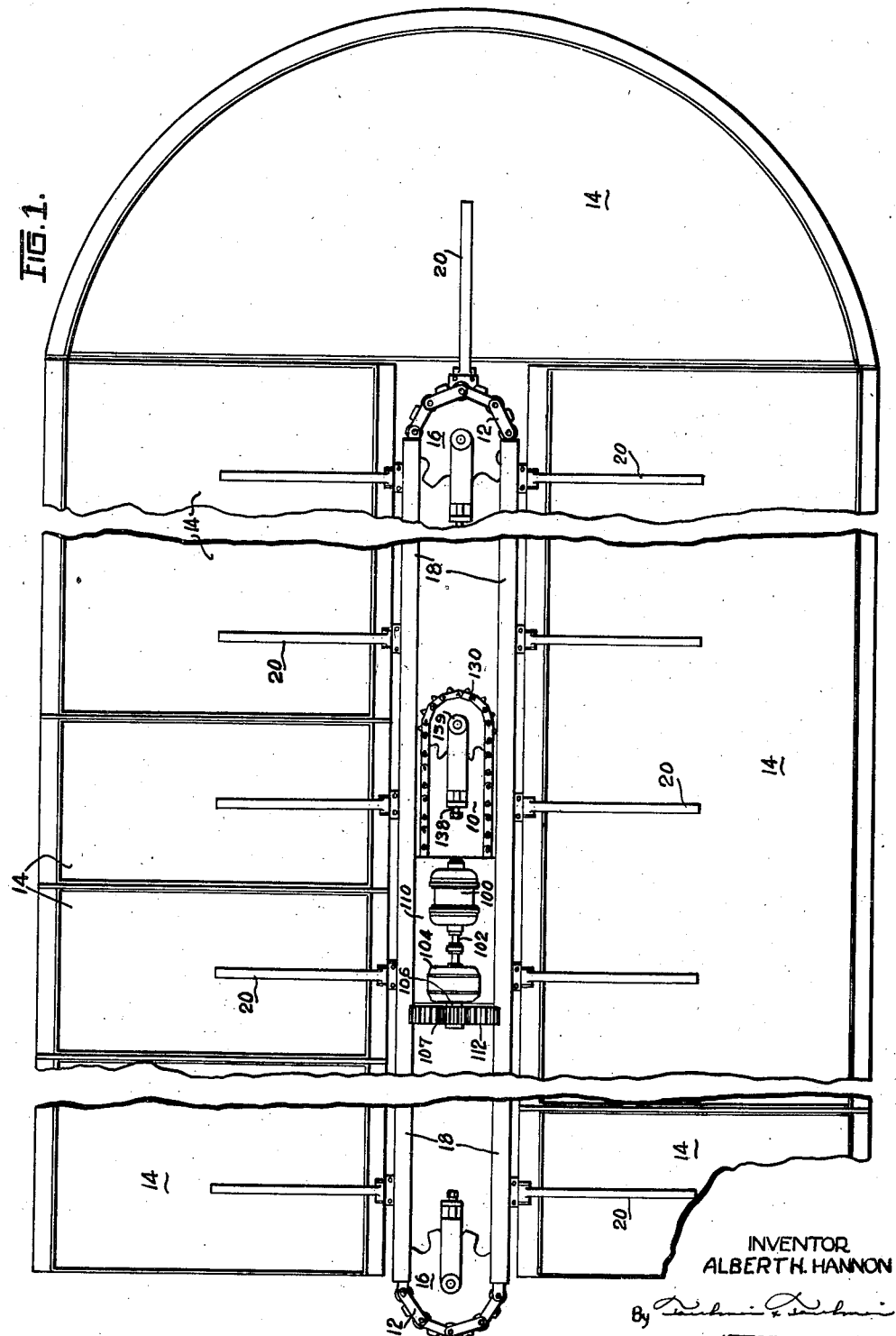
Figure 1 is a plan view of an automatic work piece conveying and processing machine, partly broken away, embodying my unitary drive mechanism of this invention.
Figure 2:
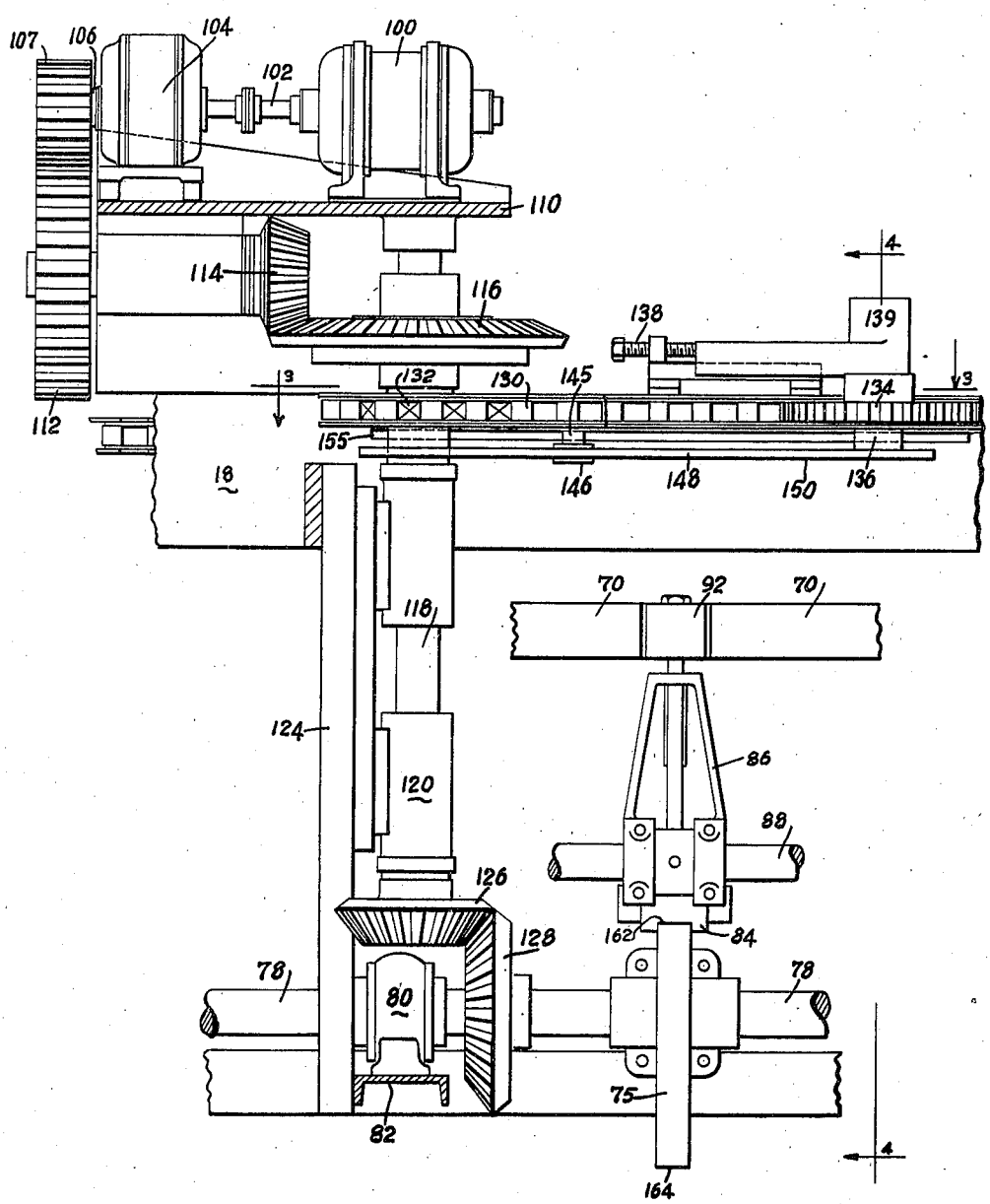
Figure 2 is an elevational view of my drive mechanism as installed on a processing machine such as shown in Figure 1.

Referring to the drawings in detail, there is illustrated in Figures 1, 2 and 4 my unitary drive mechanism, generally designated 10, as installed for operating an automatic electroplating machine such as that disclosed and described in my Patents Nos. 1,970,850, 1,985,988 and 2,030,934.

As illustrated in Figure 1, a horizontally disposed endless conveyer means 12 is suitably supported between the rows of tanks, generally designated 14. The chain means 12 is carried around the sprocket wheels 16 disposed at opposite ends of the plating machine and is guided horizontally therebetween by the curved plate means 18 arranged along the straight-away sides of the machine.

At predetermined spaced intervals along the endless conveyer chain there are provided work carrier arm means 20 which are pivotally mounted upon rods 22 carried by chain bracket means 24, which, in turn, are connected to the chain by link 25, as shown in Figure 4. Each of the curved chain guide plate means 18 comprises an upper portion 26 which partially surrounds the conveyer chain, and a lower portion 28 bent to form a channel-like rail in which the roller 30 of the chain bracket is adapted to travel. In this manner, the chain guide members 18 serve to guide the chain and also support the weight thereof by means of the bracket 24 and associated roller 30 as the same is moved along. Pivotally mounted on the chain bracket 24, as at 32, is an equalizer arm 34, the lower end of which is pivotally attached to the work piece rack supported by the carrier arm whereby upon tilting the work carrier arm the equalizer functions to maintain the rack in the same relative position with respect to the tank as when it is supported in its lowermost position. The work carrier arm 20 comprises a depending arm 36 upon which is mounted a roller 38 which is arranged to engage the rail 70.

The above mentioned equalizer bar is adapted to maintain the work piece rack in perpendicular position without disturbing the work pieces. Such an equalizer bar is illustrated in its entirety in my prior Patent No. 2,030,984, but I do not restrict myself to the particular details of construction and arrangement therein shown.

Carrier arm lifter mechanism

For providing lifting mechanism whereby the carrier arms 20 can be elevated to raise the work piece racks over the partitions between the tanks a cam operating mechanism is arranged, as illustrated in Figure 4. This cam transfer mechanism comprises a plurality of rotary cam lifters 75 which are fixed on the shaft 78 extending longitudinally of the machine and suitably journaled as at 80 on a frame supporting means 82, as shown in Figure 2. These rotary cam lifter members are of the desired shape and are adapted to be engaged by a cam roller follower member 84 mounted on one arm of an inverted Y-shaped lever 86. The other arm of the Y-shaped lever 86 is pivoted on the shaft 88 and the upper end of the lever 86 is swingably attached by means of the pin 90 to a lifter pad means 92 upon which the roller 38 of the arm 20 is adapted to be positioned when it is required that the work pieces be elevated out of one tank for transfer into the next. This pad comprises a rearwardly extending arm member 94 which is pivoted to an S-shaped equalizer link means 96, as at 97. The opposite end of the member 96 is pivotally mounted upon stationary pin means 98.

As the cams 75 are rotated by the shaft 78, the rollers 84 move upwardly and cause the Y-shaped levers 86 to swing outwardly about their pivot 88. At the same time, the equalizer links 96, which are anchored at one end, cause the pads 92 to maintain successively vertical positions as the pads move outwardly. This is effected due to the parallel-like positions of the pivot points 88, 98, 94 and 97, which form a parallel linkage similarly as in the case of the equalizer arm means 34 associated with the carrier arms 20.

Combined conveyer and lifter driving mechanism

For providing intermittent movement of the conveyer chain and the desired operation of the lifter mechanism there is utilized a unitary driving mechanism, as illustrated in Figures 2, 3 and 4. This mechanism comprises a motor or prime mover means 100 having a driven shaft 102 operatively connected through a gear reduction means 104 to a pinion drive shaft 106 on which is mounted a pinion 107. This motor driving unit is suitably mounted on a platform or base 110 near the center of the machine. The pinion 107 meshes with a spur gear 112 driving the bevel pinion gear 114 which, in turn, drives the bevel gear 116, as illustrated in Figure 2.

For rotating the cam shaft 78 on which the cams 75 are fixedly mounted the gear 116 is keyed to the shaft 118 which is suitably mounted on the ball thrust bearings 120 supported by the upright frame means 124. A bevel pinion gear 126 on the end of the shaft 118 meshes with the bevel gear 128 which, in turn, is keyed to the cam shaft 78. This provides continuous rotation of the cam shaft 78 when the motor 100 is operating.

Intermittent horizontal conveyer actuating mechanism

In order to drive the horizontal conveyer chain 12 intermittently, there is provided an auxiliary endless chain operating mechanism 130 which is arranged adjacent the main conveyer chain and movable over the sprockets 132 and 134, as shown in Figure 3. The sprocket 132 is keyed to the shaft 118 and drives the auxiliary chain 130 over the idler sprocket 134 which is rotatably mounted on the stub shaft 136. Adjustment or tightening of the drive chain 130 is provided for by the screw means 138 which is adapted to move the hub 139 in which is mounted the stub shaft 136 of the idler sprocket 134.

Pivotally mounted on the driving chain 130 are spaced dogs 140 which comprise an outwardly extending ear 142 and are adapted to engage in between the links of the main conveyor chain 12 and move it along as illustrated in Figure 3. The dogs 140 are placed on the chain in such a manner that opposite straightaway sides of the horizontal conveyer chain are engaged by the ear portions 142 of the dogs and moved along in opposite directions so as to rotate the chain about the sprockets 16. The main chain engaging dog means 140 comprises L-shaped members having one leg pivoted to a link of the chain 130 as at 144 and a depending portion 145 on which is mounted a cam roller means 146 for engaging along the cam surface 148 of the cam plate 150. This cam plate is suitably positioned below the auxiliary chain 130 and adjacent the longitudinal slot 155 in the chain guide members 18 through which the ear portions 142 of the dogs 140 are adapted to extend and engage between the links of the chain 12, as shown in Figures 2 and 4.

To provide for quick engagement and disengagement of the dogs 140 with the conveyer chain 12, the cam plate 150 is shaped to comprise reversed curved cam surface portions, generally designated 158, at opposite ends of the cam plate, as shown in Figure 3. These cam sector surfaces 158 forming the ends of the plate 150 comprise diametrically opposed similar shaped surfaces. The coaction of the cam surface, on the end of the plate 150 adjacent the idler sprocket 134, with the roller 146 of the dog 140 is illustrated in Figures 3, 5, 6 and 7. A reverse similarly shaped cam surface is formed on the opposite end of the plate 150. Referring to Figures 5, 6 and 7 the cam surface comprises an arcuate sector $a$ which intersects the straightaway horizontal portion $b$ on which the cam roller 146 is adapted to move onto when the drive chain 130 is traveling in the direction indicated by the arrow on the dotted line. When the dog 140 is advanced onto the sector $a$ it swings about the pivot 144 and the rear portion 142 slides out of contact with the links of the chain 12. A reverse curved section $c$ connects with the sector $a$ and the curved sector $c$ joins with the straightaway portion $d$ which, in turn, joins with the straight sector $e$ which intersects the opposite straightaway side portion $f$ of the cam plate in such a manner that the cam roller 146 as it advances along the straightaway sector $e$ slidably engages the wedge-shaped portion 142 of the dog in between the chain links of the conveyer chain 12 and upon passing the corner portion moves the chain along as illustrated in Figure 7.

The cams 75 may be of different shape and arranged so that the lifter mechanism will be actuated by the roller 84 engaging the cam surface whereupon the carrier arms 20 are raised and lowered or retained in their uppermost position while moved horizontally along a predetermined distance and then lowered as desired, e. g., where various sized tanks are used necessitating different cam means for effecting the proper transfer of the work pieces as they are moved along from one tank to another.

In Figures 4 to 7 a substantially heart-shaped cam is illustrated wherein the short radius curved sector 160 co-operates with the lifting transfer roller means 84 to maintain the work carrier arms 20 in their lowermost or horizontal position such as when the work pieces are positioned in the tanks for treatment. The adjacent arcuate sectors 162 co-operate with the roller 84 to effect actuation of the lever 86 to swing the lifter pad 92 outwardly, swinging upwardly the carrier arm means 20 when the roller 84 is traveling from the lowermost sector 160 toward the outer curved sector 164 of the cam members 75, as shown in Figure 7. The cam members 75 are rotated, as indicated by the arrows in Figures 5, 6 and 7, in proper co-ordination with the movement of the conveyer to bring about raising or lowering of the carrier arm means while the conveyer chain is at rest by passage of the roller cam follower 84 over the radially curved cam surfaces 162. In Figure 7 the transfer cam lifter mechanism is in position to maintain the work carrier arm means in raised position while the driving chain 130 is connected to the main conveyer chain so as to move the work carriers horizontally therealong to a new advanced position whereupon the cycle of operation is repeated. It will thus be obvious by using differently shaped cams arranged adjacent the tank or tanks where the lifting and/or lowering of the work carrier arm is to be performed, that work pieces can be automatically conveyed through a plurality of treating solutions contained in various size tanks suitably spaced along the path of the conveyor.

From the foregoing description, the operation of my unitary driving mechanism will be readily understood. In the mechanism illustrated, the motor 100 is driven continuously and the main conveyer chain on which the work carrier arms 20 are mounted is intermittently moved in accordance with the actuation of the dogs 140 attached to the driving chain means 130 and moved around the periphery surface of the cam plate 150. Further, by mounting suitably shaped rotary cam lifter means, such as at 75, along the shaft 78 where it is desired to actuate the transfer mechanism and synchronizing the lifting and lowering action of the cam so that it will take place while the main conveyer chain is stationary, the desired operation of the machine can be obtained and a fully automatic machine provided.

It will be also understood that this invention is not limited to the particular details of the driving mechanism as illustrated and it is contemplated that my invention may be readily adapted for operating other mechanism than that shown and described without departing from the spirit and scope of my invention.

Having thus fully described my invention, what I claim as new and desire to secure by Letters Patent is:

1. In combination, a frame, tanks arranged adjacent the side of said frame, a horizontally arranged endless intermittently driven chain on said frame, arms pivoted on said endless chain, a continuously driven second endless chain horizontally arranged on said frame, having means thereon for driving said first chain intermittently, a plurality of lifter means for pivoting said arms about their pivots, mechanism for operating said lifter means, common means for continuously driving said mechanism and said second mentioned chain, said lifter means being adapted to successively engage said pivoted arms and move the same about their pivots to raise and lower articles supported by said arms out of and into said tanks, the mechanism being so constructed as to cause pivoting of said arms during the time the intermittently driven chain is stationary.

2. In combination, a frame, tanks arranged adjacent the side of said frame, a horizontally arranged endless intermittently driven conveyer on said frame, arms pivoted on said endless conveyer, a continuously driven endless driving means horizontally arranged on said frame, having means thereon for driving said conveyer intermittently, a plurality of lifter means for pivoting said arms about their pivots, mechanism for operating said lifter means, common means for continuously driving said mechanism and said endless driving means, said lifter means being adapted to successively engage said pivoted arms and move the same about their pivots to raise and lower articles supported by said arms out of and into said tanks, the mechanism being so constructed as to cause pivoting of said arms during the time the endless driving means is stationary.

3. In combination, a frame, tanks arranged adjacent the side of said frame, a horizontally arranged endless intermittently driven chain on said frame, arms pivoted on said endless chain, a continuously driven second endless chain located within the area defined by said first chain and horizontally arranged on said frame, having means thereon for driving said first chain intermittently, a plurality of lifter means for pivoting said arms about their pivots, mechanism for operating said lifter means, common means for continuously driving said mechanism and said second mentioned chain, said lifter means being adapted to successively engage said pivoted arms and move the same about their pivots to raise and lower articles supported by said arms out of and into said tanks, the mechanism being so constructed as to cause pivoting of said arms during the time the intermittently driven chain is stationary.

4. In combination, a frame, tanks arranged adjacent the side of said frame, a horizontally arranged endless intermittently driven conveyer on said frame, arms pivoted on said endless conveyer, a continuously driven endless driving means horizontally arranged on said frame, having means thereon for driving said conveyer intermittently, a plurality of lifter means for pivoting said arms about their pivots, mechanism for operating said lifter means, common means for continuously driving said mechanism and said endless driving means, said lifter means being adapted to successively engage said pivoted arms and move the same about their pivots to raise and lower articles supported by said arms out of and into said tanks, the mechanism being so constructed as to cause pivoting of said arms during the time the endless driving means is stationary, said common driving means being located in the center of said frame.

5. In combination, a frame, tanks arranged adjacent the side of said frame, a horizontally arranged endless intermittently driven chain on said frame, arms pivoted on said endless chain, a continuously driven second endless chain horizontally arranged on said frame having means thereon for driving said first chain intermittently, a plurality of lifter means for pivoting said arms about their pivots, mechanism for operating said lifter means, including a replaceable cam, common means for continuously driving said mechanism and said second mentioned chain, said lifter means being adapted to successively engage said pivoted arms and move the same about their pivots to raise and lower articles supported by said arms out of and into said tanks, the said mechanism being so constructed as to cause pivoting of said arms during the time the intermittently driven chain is stationary.

ALBERT H. HANNON.